March 11, 1958 — F. S. LAPEYRE ET AL — 2,825,927
SHRIMP VEIN REMOVER

Filed July 8, 1954 — 7 Sheets-Sheet 1

INVENTORS
F. S. Lapeyre
J. M. Lapeyre

BY Wilkinson & Mauhinney
ATTORNEYS

March 11, 1958

F. S. LAPEYRE ET AL 2,825,927

SHRIMP VEIN REMOVER

Filed July 8, 1954

INVENTORS
F. S. Lapeyre
J. M. Lapeyre

BY Wilkinson & Mawhinney

ATTORNEYS

March 11, 1958 F. S. LAPEYRE ET AL 2,825,927
SHRIMP VEIN REMOVER

Filed July 8, 1954 7 Sheets-Sheet 5

INVENTORS
F. S. Lapeyre
J. M. Lapeyre

BY Wilkinson Mawhinney
ATTORNEYS

March 11, 1958  F. S. LAPEYRE ET AL  2,825,927
SHRIMP VEIN REMOVER
Filed July 8, 1954  7 Sheets-Sheet 7

INVENTORS
F. S. Lapeyre
J. M. Lapeyre

BY *Wilkinson & Mawhinney*
ATTORNEYS

United States Patent Office 2,825,927
Patented Mar. 11, 1958

2,825,927

SHRIMP VEIN REMOVER

Fernand S. Lapeyre and James M. Lapeyre, New Orleans, La., assignors to The Peelers Company, Houma, La., a partnership Application July 8, 1954, Serial No. 442,042

22 Claims. (Cl. 17—2)

The present invention relates to shrimp vein remover and more particularly to a machine for removing the sand vein or alimentary canal which lies through a groove in the back of the shrimp and is protected by a membrane stretched thereover.

This membrane is suitably slit in a machine which forms the subject matter of a prior co-pending application, now Patent No. 2,694,218, filed August 19, 1952, and entitled Shrimp De-veining Machine in the names of the present joint applicants.

In that machine according to the prior application aforesaid substantially all of the back membranes of the shrimp are suitably slit but not all of the veins so exposed are washed out by the action of the water used in connection with the operation of that machine.

In cases where the shrimp are subjected to further processing, such as "blanching" preliminary to canning, many more veins are removed. However, not all veins are so removed and some plants do not subject the shrimp to further processing after the de-veining operation.

Accordingly, the present invention aims to provide a device to mechanically remove substantially all veins from shrimp whose backs have previously been slit on the de-veining machine according to the prior application. A machine according to the present invention is arranged in series with the shrimp de-veining machine according to Patent No. 2,694,218 so that the present shrimp vein remover receives the shrimp from the aforesaid shrimp de-veining machine.

It is a further object of the present invention to provide lips or hook-like members which will engage through the loops of the veins where the veins remain attached at opposite ends to the shrimp and by which such veins are pulled loose from the shrimp.

It is another object of the present invention to provide wedge-like members in which the veins which have already become detached from the shrimp body at one end will become caught and wedged so that the attachment at the other end of the vein may be pulled loose from the shrimp.

It is a further object of the present invention to combine in one embodiment thereof both the hook-like and the wedge-like members so that the veins, in either condition described, will be dealt with effectively by such members.

It is a still further object of the present invention to provide a machine in which either the hook-like and wedge-like members are moved relatively to the shrimp, or the shrimp are moved relatively to the hook-like and wedge-like members to result in the necessary pull or movement by which the vein is removed from the body of the shrimp. The present illustrated embodiment of the invention combines both relative movements.

It will be understood that the shrimp are shelled in a preliminary machine which precedes the de-veining machine, according to Patent No. 2,694,218, so that the shrimp are both shelled and slitted when delivered to the machine according to the present invention.

It is a still further object of the present invention to provide means for clearing the lips or the hook and wedge-like members from veins or fragments of veins which may cling thereto.

The single embodiment of the invention illustrated in the accompanying drawings discloses the lips or the hook and wedge-like members as carried about by a rotary drum and it is a further object of the present invention to provide for the support and rotation of such drum in a novel manner.

With the foregoing and other objects in view, the invention will be more fully described hereinafter, and will be more particularly pointed out in the claims appended hereto.

In the drawings, wherein like symbols refer to like or corresponding parts throughout the several views.

Referring more particularly to the drawings and for the present to Figures 11, 12 and 13, 20 designates a peeled shrimp meat, and 21 and 22 represent parts of the protective membrane that has been severed by the machine according to the invention of the prior patent aforesaid. The sand vein or alimentary canal is represented at 23 and in the instance shown has both of its ends still in attachment to the shrimp body 20.

In accordance with the invention a lip 24 is provided upon a suitable supporting member 25, in this instance, a sheet metal drum as hereinafter described. The lip 24 has a free edge which is preferably smooth and rounded as indicated more particularly in Figure 11. The point of attachment or juncture 27 of the lip 24 with its supporting member 25 is such that the lip 24 extends off the supporting member 25 at substantially an acute angle. A perforation 28 is preferably made in the supporting member 25 opposite to the lip 24.

Figure 12:
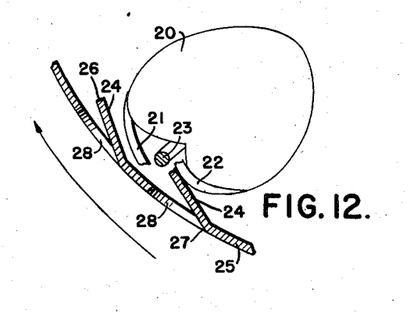
Figure 12 is a diagrammatic view showing a section of the drum with the lips moving in the direction of the arrow and with one of the lips about to engage the sand vein, the slit membrane being also illustrated.

The supporting member 25 may be movable in the direction of the arrow in Figure 12 or the shrimp 20 may be moved in the opposite direction by the movement of water through the drum 25 as later described and the force of gravity acting on the shrimp. Or both supporting member 25 and shrimp 20 may both be movable in relatively opposite directions. In either event the free edges 26 of the lips 24 lead so that in the first instance, as shown in Figure 12, a lip 24 engages membrane section 22 and moves the same out of the way down against the shrimp meat 20 so that further relative movement between the supporting member 25 and the shrimp meat 20 will result in the lip 24 hooking through the loop of the sand vein 23 in the manner indicated in Figure 13. After this engagement further relative movement between the supporting member 25 and the lip 24 will result in pulling the sand vein 23 completely away from its attachment with shrimp meat 20. In this respect the lip 24 acts as a hook-like member to hook into the loop provided by the sand vein 23.

Incident to former processing, where the sand vein 23 may have become detached from the shrimp body 20 at one end only, and due to the acute angle, relationship between the lips 24 and the supporting member 25, such sand vein 23 may become wedged in the progressively narrowing gap or mouth between the lip 24 and the supporting member 25. The inner end of this mouth or gap ends in a closed angled crotch. In this aspect, the lips 24 are wedge-like members in their relationship to the supporting member 25 or drum.

Figure 11:
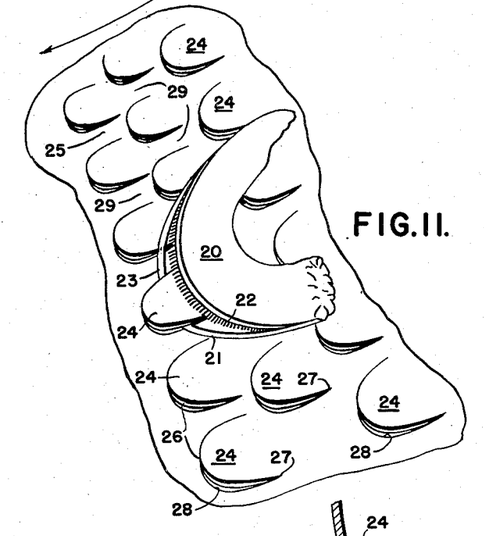
Figure 11 shows a fragmentary sectional view of the drum with one of the lips or hook or wedge-like members engaged through the loop of a vein of a shrimp.

As many of the lips 24 as desired may be repeated over the surface of the supporting member 25. Where the supporting member 25 is a drum, the lips 24 may be repeated in progressive series around the entire periphery of the drum and throughout its longitudinal extent.

Where the drum is rotary, that is mounted for rotatable movement, the direction of rotation will be with free edges 26 of the lips 24 leading and the points of attachment or crotches 27 trailing.

Where the lips 24 are stamped out of the sheet metal 25 of the drum and the perforations 28 are co-extensive with the areas of the lips 24, the gaps or mouths referred to are between the lips and the side edges of the perforations 28 and also between the lips and the blank intermediate portions 29 of the supporting member 25 between adjacent lips 24 which, as shown in Figure 11, are preferably spaced apart laterally. In this Figure 11, the sand vein 23 is shown as being caught beneath the lip 24 and being bound by a lip against the side edges of the respective perforation 28 and the two flanking blank intermediate portions 29 of the drum.

Where the supporting member 25 is a drum, the lips 24 are offset inwardly from the peripheral wall of the drum. Where perforations 28 are provided, a stream of liquid may be directed therethrough and against the lips 24 in a clearing action to remove accumulated sand veins therefrom.

Figure 13:
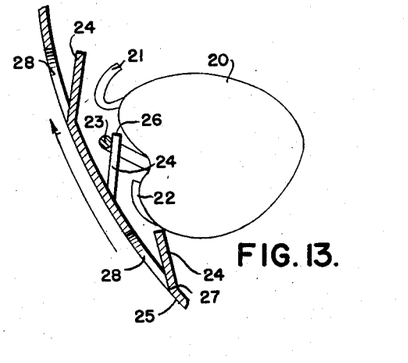
Figure 13 is a similar view showing a subsequent position of the drum in which the lip has pushed aside one section of the slit membrane and has engaged through the loop of the sand vein.

Referring more particularly to Figure 13, while one lip 24, as before stated, has pressed the membrane section 22 out of the way down against the shrimp, an advanced lip 24 has wiped the other membrane section 21 out of the way by folding it back. In Figure 13, the membrane section 21 is shown as substantially folded back upon itself out of the way.

Referring now more particularly to Figures 1-5, inclusive, 30 designates an introductory chute by which the shrimp are fed into the upper end of the drum 25, and 31 represents the discharge chute through which the treated shrimp are removed from the drum in a continuous operation.

The introductory chute 30 extends through the upper drum head 32 while the discharge chute 31 extends through the lower drum head 33.

The drum heads 32 and 33 are provided with cylindrical flanges 34 and 35, respectively, in which are produced grooves 36 running annularly around the flanges and preferably of a V-shaped cross-section to receive the upper and lower belts 37 and 38 which are also preferably of a V-cross-section.

The drum 25 is slung in the belts 37 and 38 and has no other support. In other words, the belts 37 and 38 not only drive but also support the drum 25.

The belts 37 and 38 are supported and driven by upper and lower pulleys 39 and 40 which are fast upon a drive shaft 41.

Figure 3:
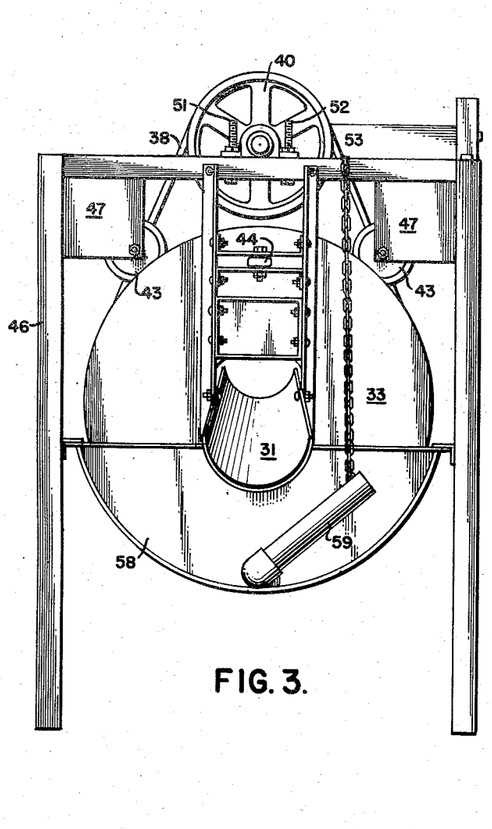
Figure 3 is an enlarged end elevational view of the machine taken from the discharge end.
Figure 4:
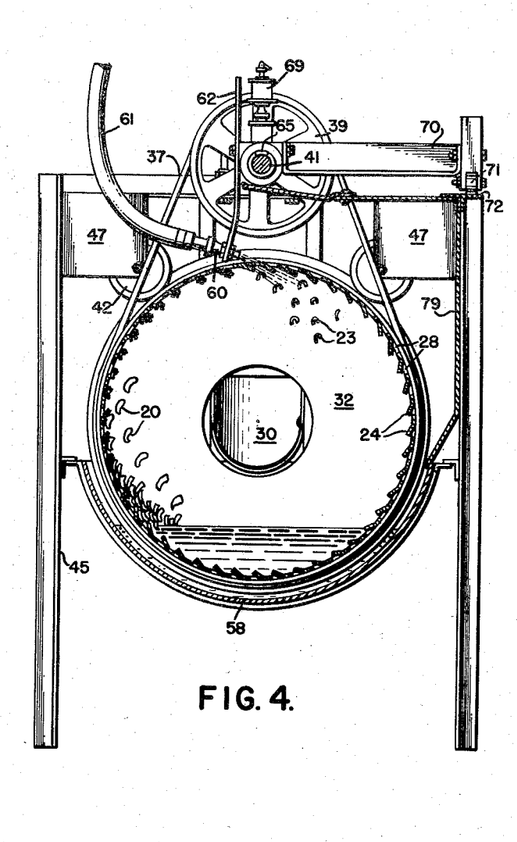
Figure 4 is an enlarged vertical transverse section taken through the machine on the line 4—4 of Figure 2.

The belts 37 and 38 pull the drum 25 up against upper and lower positioning casters or rollers 42 and 43. There are only two caster or rollers 42 and only two casters or rollers 43. As shown in Figures 3 and 4, these pairs of rollers 42 and 43 are disposed only at the upper side of the drum 25. There are no supporting rollers of any kind below the drum. The function of the rollers or casters 42, 43 is simply to center or position the drum in the frame. The drum 25 must be substantially centered within the frame so as to maintain its proper position with respect to the liquid tank as hereinafter described.

The drum 25 is preferably suspended upon a slight inclination with its higher end at the upper head 32 where the shrimp are fed to the drum and with its lower end at the head 33.

The upper positioning casters 42 are carried by an upper frame 45 while the lower positioning casters 43 are rotatably mounted in a lower frame 46. The thrust caster 44 is also mounted in the lower frame 46 so as to receive thereagainst the lower head 33 to prevent the drum or cylinder from contacting the lower frame 46.

Figures 8, 9, 10, 14:
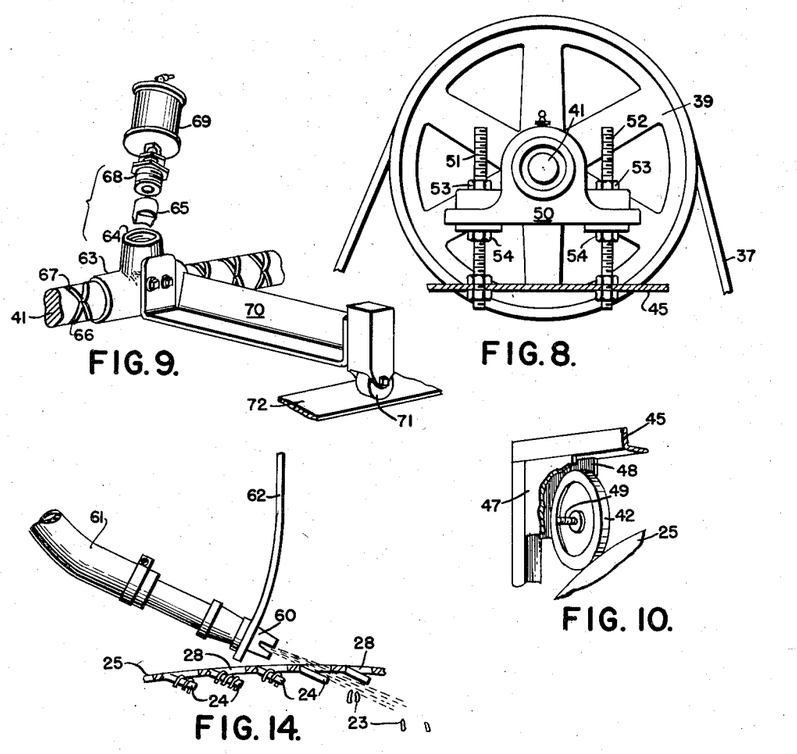
Figure 8 is an enlarged end elevational view of the drive shaft and one of the pulleys with parts shown in section and illustrating a form of belt tightener.
Figure 9 is a fragmentary perspective view of the drive shaft with the double spiral worm arrangement with the key or pawl and grease cup in exploded positions and with the outrigger arm engaging a track on the machine frame.
Figure 10 shows a detail corner section of the frame with one of the rollers or casters engaged by an upper portion of the drum.
Figure 14 is a detail view showing a flat or blade-like sheet of water issuing from the nozzle through a perforation of the drum and against the lip in a vein-clearing operation.

One of the casters 42 is shown in Figure 10 as bearing directly upon the peripheral exterior surface of the drum 25. Webs 47 and 48 of the frame 45 receive the shaft 49 of the roller or caster 42. A like support may be provided for the other or lower casters 43.

Referring more particularly to Figure 8, the drive shaft 41 is shown as supported in bearings 50 which are adjustable through the adjusting screws 51 and 52 and the pairs of nuts 53 and 54. The adjusting screws 51 and 52 are secured at their lower ends to the frame 45. A similar adjusting device is duplicated at the lower frame 46. By loosening the upper adjusting nuts 53 and running the lower adjusting nuts 54 upwardly on the screws 51 and 52 the entire drive assembly including the shaft 41 and the two pulleys 39 and 40 may be elevated to take up any slack in the belts 37 and 38 and to maintain the drum or its flanges 34, 35 tightly up against the casters 42, 43. After adjustment, the nuts 53 may be tightened down upon the screws 51 and 52 and against the bearing blocks 50.

Figure 5:
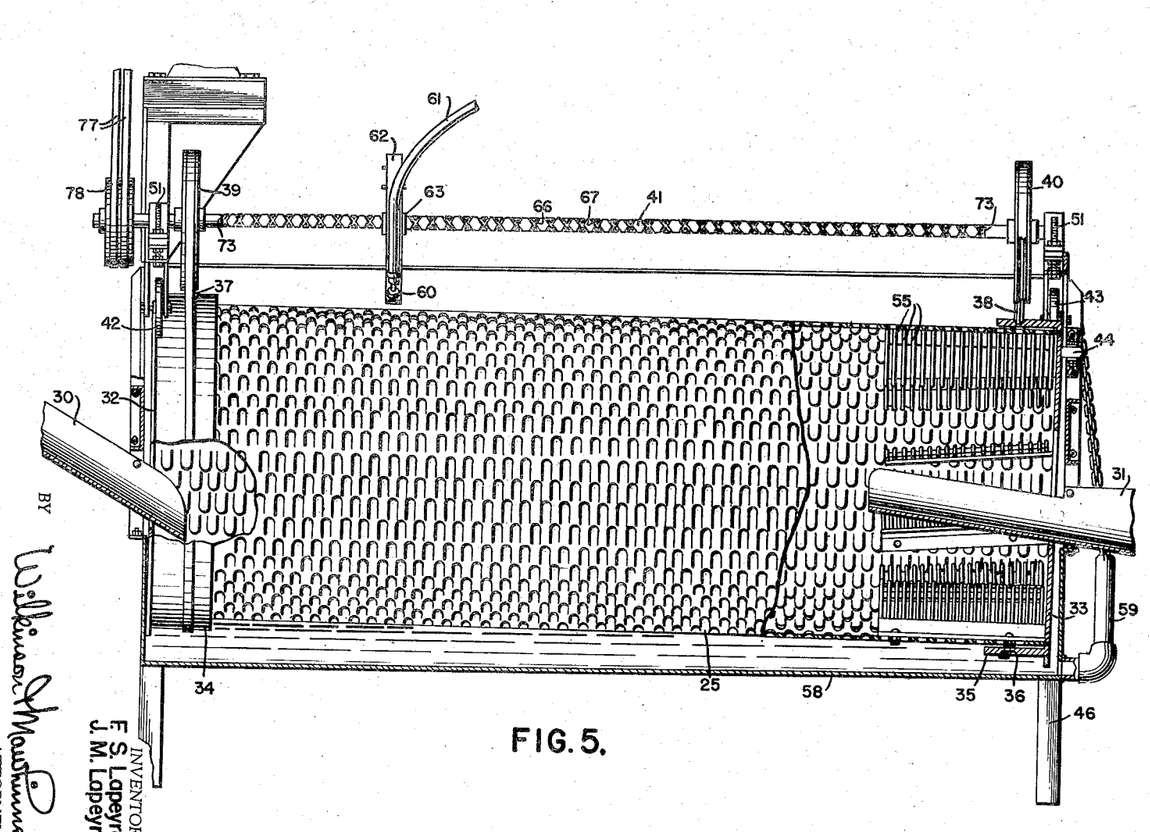
Figure 5 is an enlarged fragmentary side elevational view with parts broken away and with parts in section.
Figure 6:
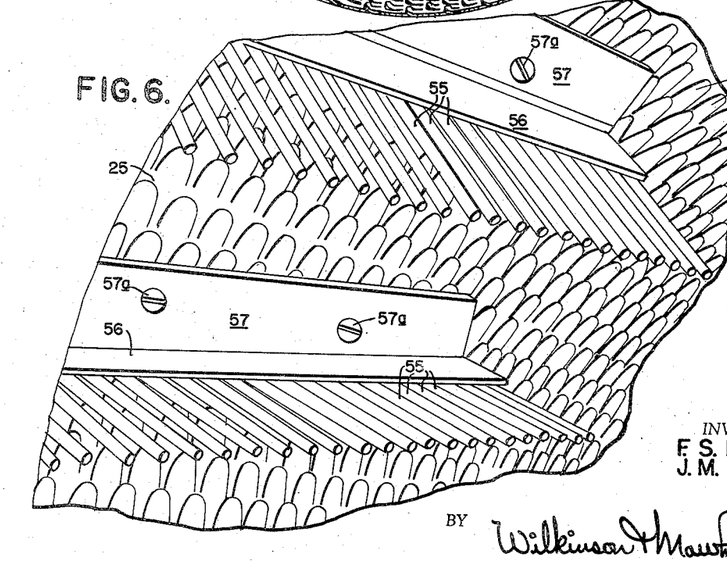
Figure 6 is a perspective view, taken on a magnified scale, showing a section of the drum and two of the comb-like scoops.
Figure 7:
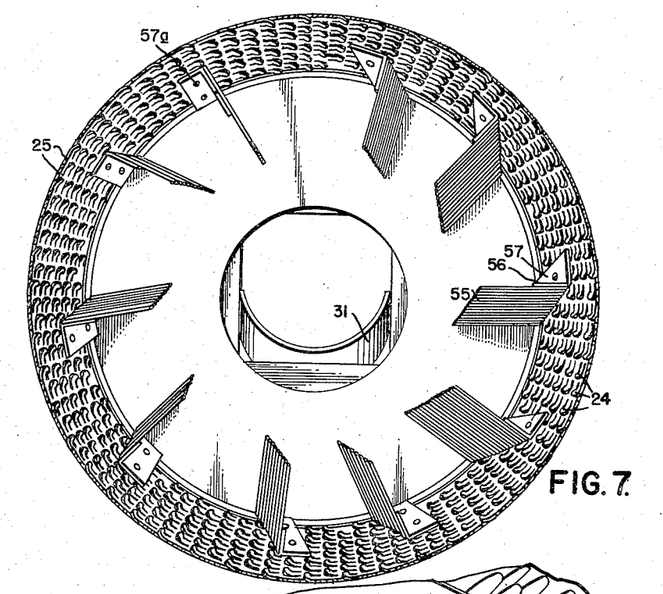
Figure 7 is a perspective view of the discharge end of the drum showing the comb-like scoops.

Referring more particularly to Figures 5, 6 and 7, scoops are provided at the discharge end of the drum 25 which rotate around with the drum concentrically with the inner portion of the discharge chute 31. These scoops are for the purpose of lifting the treated shrimp to an elevated position in the drum over the receiving end of the discharge chute 31 from which position the treated shrimp may fall onto the chute 31 and slide out of the drum. Such scoops are preferably of a comblike construction comprising each a number of tines or teeth which are spaced apart longitudinally of the drum. These combs or scoops are also preferably arranged at an angle to the longitudinal axis of the drum. The tines or teeth 55 may be welded or otherwise secured to angle flanges 56 which extend inwardly from attaching plates 57 secured to the interior of the drum by screws or other fastenings 57a.

Referring more particularly to Figures 3, 4 and 5, a tank 58 for water or other liquid is mounted in the frames in position to receive the lower portion of the drum 25 which rotates through the liquid contained in the tank as indicated more particularly in Figure 4. An adjustable overflow pipe 59 connects with the tank and projects outwardly of the lower frame 46. This pipe may be rotated about its elbow connection to elevate or lower its open discharge end which will thus control the liquid level in the tank 58.

Referring more particularly to Figures 4, 5 and 14, while the water to supply the tank 58 may be received from any appropriate source, it is economically received from a nozzle 60 which is given a traversing movement longitudinally of the drum and is so directed with respect to the lips 24 that it has a second function of clearing these lips of accumulated veins 23. The nozzle 60 is in communication with any desired source of water or other liquid through a flexible hose connection 61 which permits the nozzle 60 to move upwardly and downwardly along the surface of the drum. The nozzle 60 is carried and moved by a supporting arm 62, which arm is in turn supported and moved by a sleeve 63 which is slidable over the drive shaft 41.

As shown more particularly in Figure 9, the sleeve is provided with a socket 64 in which is housed a key or pawl 65 adapted to interfit with the worm grooves 66 and 67 of the drive shaft 41. These grooves are right and left hand, respectively, and are of the proper lead to give the nozzle 60 a desired rate of feed back and forth over the drum. The key or pawl 65 is held in the socket 64 by a screw plug 68 which also carries a lubricant cup 69 for supplying oil or other form of lubricant to the key or pawl 65 at its point of travel in the worm grooves 66, 67. The sleeve 63, arm 62 and nozzle 60 are prevented from rotation by an outrigger bracket 70 connected to the sleeve 63, as shown in Figure 9. The outer free end of the bracket 70 carries a roller 71 rolling upon a track 72 mounted in the frame of the machine.

Transfer grooves 73 are provided at the ends of the worm grooves 66, 67 to permit the key or pawl 65 to transfer from one spiral groove to the other at the opposite ends of its travel. In this way, the nozzle 60 is automatically reversed so that it travels back and forth in a reciprocating motion axially along the surface of the drum 25.

Figure 1:
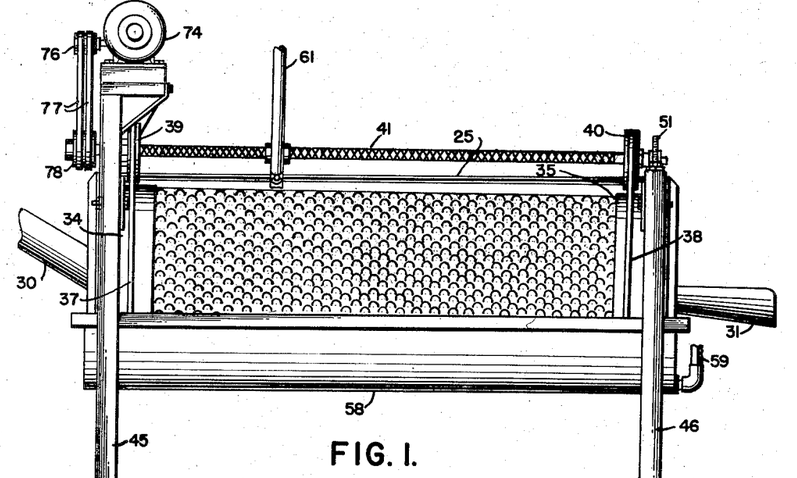
Figure 1 is a side elevational view of a shrimp vein remover constructed in accordance with the present invention.
Figure 2:
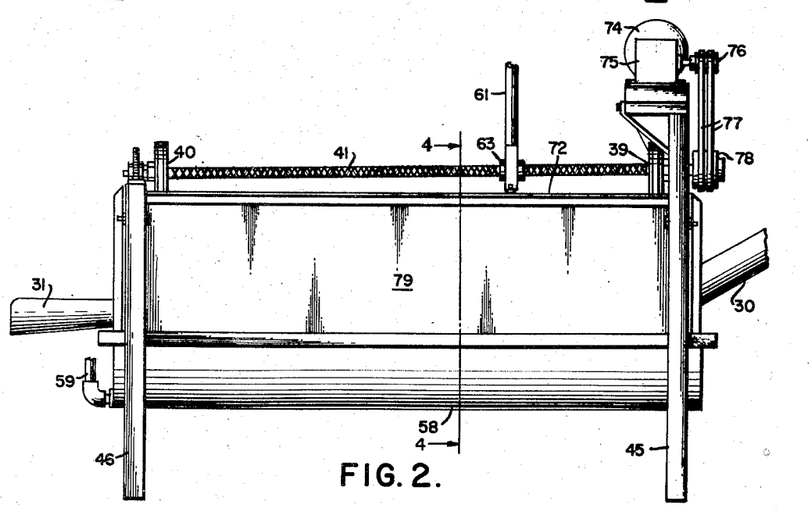
Figure 2 is a similar view taken from the opposite side of the machine.

Referring more particularly to Figures 1 and 2, a form of drive for the shaft 41 is shown to involve an electric or other motor 74 driving through a reduction gear 75 pulleys 76 and entrained belts 77 which in turn drive the pulleys 78 affixed to the drive shaft 41.

Referring more particularly to Figures 2 and 4, one or more splash or spray shields 79 may be provided along that side of the drum and machine which is opposed to the water spray directed by the nozzle 60. Thus the shield intercepts this water spray and prevents the water from scattering. As shown in Figure 4, this shield will also direct the water to the tank 58.

In operation, the motor-driven drive shaft 41 serves two purposes:

First, it imparts rotary motion through the V-belts to the drum or cylinder 25. The speed of rotation of the drum may be relatively low, i. e., from ten to twenty-five revolutions per minute.

Second, its worm grooves 66, 67 engaging the pawl or key 65 activate the worm follower assembly through the sleeve 63, slowly moving this assembly up and down the length of the drive shaft, the assembly carrying with it the flexible hose 61 and attached slit nozzle 60 to direct a blade of water against the outer surface of the drum or cylinder at an angle calculated to force the water into the lip openings 28 of the drum or cylinder 25.

The primary purpose of the worm assembly carried hose and slit nozzle 60 is to wash out of the lip openings 28 the accumulated veins caught in the bights of the lips 24 so as to prevent excessive blockage of the bights by accumulated veins which would impair the efficiency of the device. The same purpose could be achieved by one continuous sheet of water directed along the entire length of the drum or cylinder 25. In the interest of economy of water, however, the one small slit nozzle 60 has been provided to travel up and down the length of the drum or cylinder 25.

A secondary purpose of the hose and slit nozzle 60 is to provide water to maintain a level of water in the tank 58 disposed beneath the drum or cylinder 25.

The lip formations of the rotating drum 25 are such that the lips 24 protrude inside the drum with the rounded ends of the lips constituting the leading edges of the lips as the drum rotates.

In the perforation of the metal used to form the drum, the punch is driven from the side opposite to the side of protrusion so that the burrs which remain on the lips 24 are to the inside of the lip gaps. Accordingly, only smooth lip edges are presented for direct contact with shrimp within the drum thereby avoiding excessive mutilation. The gap openings 28 of the lips are such as to permit the leading edges of the lips to engage the veins in the backs of the shrimp without excessive engagement of valuable shrimp meats, i. e., the gap should not be so large as to grab the shrimp meats themselves.

It has been noted that the lips form angles with the remaining inner surface of the cylinder 25. It is to be further noted that when shrimp whose backs have been previously slit are agitated in a volume of water the veins, which are usually firmly attached to the meat only at the head and/or tail ends of the shrimp, are washed free from the meats except at the mentioned point or points of firm attachment. This loosening of the veins is also promoted by the raking action of the lips 24 against the backs of the shrimp.

Accordingly, when such shrimp are introduced into the rotating drum and are agitated in the volume of water, the loosening action referred to takes place. As the drum 25 rotates, the leading edges of the lips 24 engage the loosened veins which slide into the mouths of the angles formed by the lips to become caught or locked at the apexes of such angles. In cases where the vein is firmly attached only at head or tail rather than at both points, the vein will be washed into the lip. In either case, the veins are pulled away and detached from the meats.

The initial loosening of the veins and their entrapment in the bights of the lips is promoted by the movement of water through the perforations 28 in the cylinder 25 as the cylinder rotates, the direction of the movement of water being from the inside of the drum or cylinder to the outside thereof.

It has been found that after a quantity of shrimp have been subjected to the action of the device, the bights of the lips 24 become clogged with accumulated veins caught therein so that further veins cannot be locked therein. Unless the accumulated veins are removed, the device will lose its efficiency. The forceful slit of water emitted from the nozzle 60 effectively washes out the accumulated veins from the lip as the nozzle travels up and down the length of the drum.

It has been said that the drum is preferably slightly inclined. This inclination is not essential to the operation of the machine but it is believed that the slight inclination promotes greater efficiency in operation in two respects:

First, the inclination is of some effect in promoting the travel of shrimp from the intake end of the drum to the discharge end thereof.

Second, if the drum were level, a caster, such as appears at 44 at the discharge end, would have to be placed at the intake end and there would be a tendency for the drum to reciprocate axially within the limits allowed by the two end thrust casters. Smoother operation is achieved with the inclined drum and the single thrust caster 44.

The travel of the shrimp from the intake end 30 to the discharge end 31 is promoted by three factors:

First, the action of gravity in relation to the inclination of the drum.

Second, since the shrimp are in a state of semi-flotation in the water within the drum and since the water overflow is located at the discharge end, there is a current of water running from the intake end to the discharge end, which carries the shrimp along with it, particularly when the slit-nozzle 60 is introducing water into the drum 25 near the intake end 30 thereof.

Third, the shrimp in a state of semi-flotation tend to spread out or distribute themselves somewhat evenly within the limits of the confining drum 25. Accordingly, since shrimp are introduced at one end and removed from the other end, the newly introduced shrimp naturally travel towards the discharge end 31.

The tank 58 preferably has substantially the same inclination as the drum of cylinder 25 so that there is a deeper level of water in the tank 58 at the discharge end than at the intake end.

The key or pawl 65 is free to turn within the socket or pawl housing 64 and to follow the groove track or guide track at the ends of the drive shaft while switching from one groove to the other. The plug 68 which screws into the upper end of the socket or pawl housing 64 prevents excessive upward movement of the key or pawl 65 which might cause disengagement of the pawl from the worm tracks.

The height of the water in the tank 58 may be maintained at a level of from three to five inches from the bottom of the revolving drum or cylinder 25. The machine is operable with a higher or lower level of water but it has been found that the level mentioned is most satisfactory in operation.

The shrimp do not actually float in the water in the drum since the density of the shrimp is slightly greater than that of water. However, the difference in density is rather slight so that the sinking of the shrimp in the water is relatively slow and the pressure of the shrimp against the interior of the drum is very slight. The presence of water in the tank and drum is of importance inasmuch as the lessening of the pressure of the shrimp against the drum resulting from the use of water is instrumental in avoiding excessive abrasion of the shrimp as they come in contact with the surface of the revolving drum.

The water jet 60 is preferably of such force as to break the veins into small particles which are then washed through the perforations 28 in the drum 25 into the tank 58 beneath the drum.

Figures 15, 17:
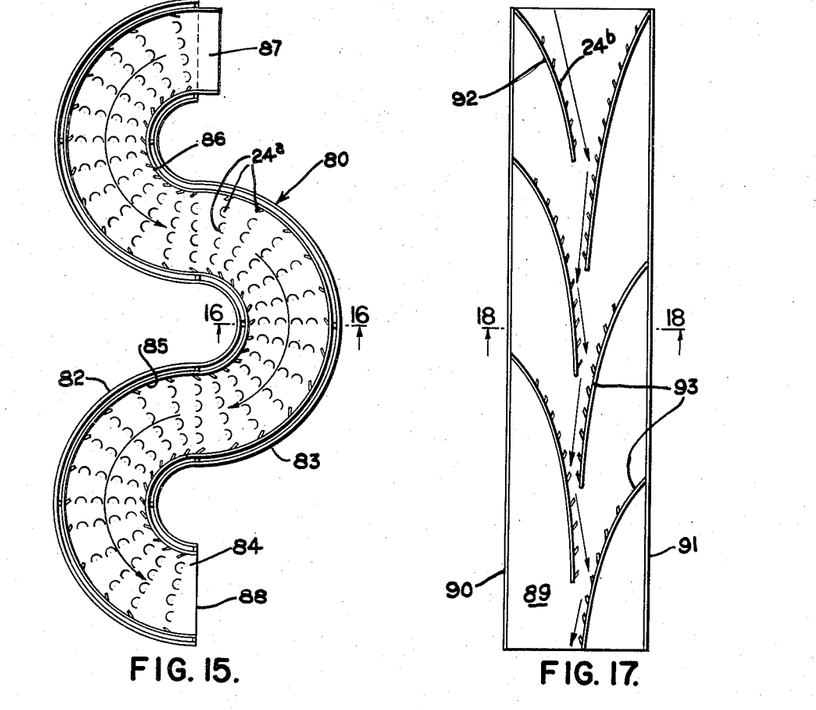
Figure 15 is a top plan view of a modified form of machine in which the lips or hooks are stationary and the shrimp are moved thereagainst, for example, by a current of water or other liquid.
Figure 17 is a plan view of a further modified form of the invention in which stationary overlapping baffles carry the lips or hooks, the shrimp being moved through and against the baffles as by a current of water.
Figure 16:
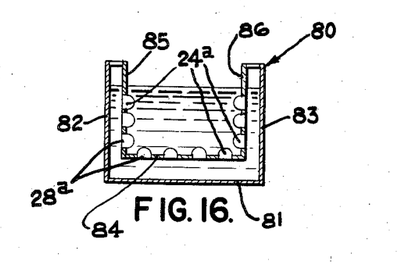
Figure 16 is a cross-sectional view taken on the line 16—16 of Figure 15.

Referring more particularly to Figures 15 and 16, a modified form of the device is illustrated in which a stationary trough 80 is provided having a bottom wall 81 and side walls 82 and 83. The walls and the bottom of this trough, which may, for example, be in the form of a serpentine, are preferably blank or imperforate in order to retain a body of water which moves through the trough in the direction of the arrows indicated in Figure 15.

Within the trough and spaced from the bottom and sides thereof is a false bottom 84 and false vertical sides 85 and 86 which are suspended in the trough by any suitable supports providing liquid chambers below the false bottom 84 and outwardly of the false side walls 85 and 86. The false bottom 84 and side walls 85, 86 constitute an inner trough having an induction end 87 for the liquid and shrimp and a discharge end 88. The false bottom 84 and side walls 85, 86 are provided with perforations 28ª and lips 24ª which have their free edges directed toward the induction end 87. These perforations and lips may be similar to the perforations and lips 28 and 24 heretofore described.

In the use of this device, it will be understood that the stationary supporting members or walls for the lips 24ª past which the shrimp are moving are stationary. Shrimp are carried along the trough and past the perforations 28ª and lips 24ª by a current of water circulated by any suitable means through the inner trough from the induction end 87 to the eduction end 88. As the peeled shrimp are propelled by the stream of water past the lips 24ª, the loosened and projecting veins will be caught upon and in the bights of the lips 24ª and pulled from the shrimp. The circulating water also encountering the lips 24ª will tend to be diverted through the openings 28ª so as to break up the veins into small particles and cause the same to move through the perforations 28ª into the chambers between the inner and outer trough which chambers are also open to the discharge end 88 of the twin troughs. The snake-like design of the trough is not essential but this design affords a more varied attack of the lips upon the shrimp veins and is therefore more efficient in operation than a straight trough although the latter is within the contemplation of the invention.

Figure 18:
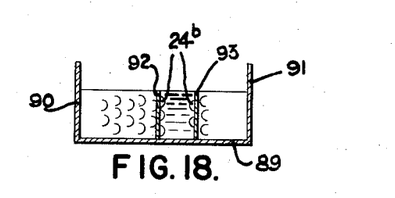
Figure 18 is a vertical cross-sectional view taken on the line 18—18 of Figure 17.

Referring more particularly to Figures 17 and 18, a straight form of trough is illustrated comprised of a bottom wall 89 and erect side walls 90, 91 which is adapted to receive peeled shrimp at one end and the deveined shrimp having an exit at the other end of the trough, the peeled shrimp being carried through the trough in the direction of the arrows shown in Figure 17 by a stream of water or the like. Within the trough are two sets of baffle plates 92, 93 which are perforated and carry lips 24ᵇ having their free ends faced toward the induction end of the trough. These baffles 92, 93 are preferably curved so as to present convex rounded surfaces to the oncoming shrimp, the better to expose the projecting veins to the lips 24ᵇ. The baffle plates 92, 93 may rest upon the bottom 89 of the trough and the forward ends of the baffles may be in contacting relation with the side walls 90, 91 to which they may be affixed if desired.

The peeled shrimp are carried through the stationary trough and the stationary baffles by a suitably strong current of water or other liquid. The baffles 92, 93 are in overlapping relationship and the curved or convex wall of one baffle will deflect the current and the shrimp from one side to the other of the trough, that is against the convex wall of the overlapping baffle on the opposite side, in a zig-zag like course to insure that the shrimp are subjected to large areas of the lips 24ᵇ on the baffle plates. The current of water is also preferably sufficiently strong so as to break up into small particles the removed veins and to wash the same through the perforations in the baffles so as to keep the lips 24ᵇ clear for most efficient action. The shrimp and these particles may be separated in a subsequent operation.

In the cases of Figures 15–18, the troughs are horizontal or near horizontal so as to maintain in the trough at all times a body of water or liquid up to a preselected level.

Although we have disclosed herein the best form of the invention known to us at this time, we reserve the right to all such modifications and changes as may come within the scope of the following claims.

What is claimed is:

1. In a shrimp vein remover, a supporting member, a lip projecting at an acute angle from the supporting member and having a smooth rounded free edge for engaging beneath the vein of a shrimp and for wedging the vein between the lip and the supporting member, and means operatively associated with said supporting member for relatively moving the shrimp with respect to said member to cause separation of the vein from the shrimp meat.

2. In a shrimp vein remover, a perforated drum, means for supporting the drum at an inclination, means operatively associated with the drum to feed peeled shrimp into the higher end of the drum, means operatively associated with the drum for withdrawing the treated shrimp from the lower end of the drum, lips projecting inwardly from the drum at substantially acute angles to the drum circumference, said supporting means also serving to drive the drum in the direction of the leading edges of the lips, and means operatively associated with said drum and lips for projecting a flat sheet of water against the lips to clear the same of accumulated veins.

3. In a shrimp vein remover, a tank, a perforated drum having a lower portion, means operatively associated with the drum to support the drum with its lower portion rotating in the tank, means operatively associated with the drum and tank for introducing liquid to said drum and said tank, means operatively associated with the tank for maintaining the liquid level in the tank at a predetermined height, lips projecting inwardly at acute angles from the drum wall, and means for introducing shrimp into the upper portion of said drum and removing shrimp from the drum lower portion, said supporting means also serving to rotate the drum.

4. In a shrimp vein remover, a rotary drum, vein removing means on the inside of said drum, means operatively associated with the drum for introducing shrimp at one end portion of the drum, and means operatively associated with said drum for relatively moving the shrimp and drum to separate the vein from the shrimp, a discharge chute having a portion extending into the opposite end of the drum, and scoops rotating with such opposite end of the drum internally thereof and adapted to raise the treated shrimp above the chute and drop the same thereupon.

5. A shrimp vein remover as claimed in claim 4 in which the scoops are of comb-like form comprising separated teeth.

6. In a shrimp vein remover, a rotary drum, shrimp vein removing means on the inside of said drum, means operatively associated with the drum for introducing and removing shrimp from the drum, positioning casters operatively associated with said drum for engaging the upper side of the drum only, drive belts in which the drum is supported and rotated, drive means operatively associated with said belts for driving said belts, and adjusting means operatively associated with said drive belts and said drive means to lift the drum into contact with said positioning casters.

7. In a shrimp vein remover, a rotary drum, shrimp vein removing means on the inside of said drum, means operatively associated with the drum for driving said drum comprising a drive shaft having right and left intersecting grooves connected together at their opposite ends, a sleeve mounted to travel axially along said shaft, a key carried by said sleeve and engaging in the grooves of the shaft for propelling the sleeve axially as the shaft is rotated, and means operatively associated with said sleeve for preventing the rotation of said sleeve, and means operatively associated with said shrimp vein removing means and carried back and forth by said sleeve for directing a spray of fluid against said shrimp vein removing means and against the shrimp to assist in properly locating the shrimp with respect to the vein removing means.

8. In a shrimp vein remover, a rotary drum, means in the drum for removing the veins from shrimp, a nozzle operatively associated with said drum for directing fluid against said means to clear the same of accumulated veins and to assist in properly locating the shrimp with respect to the vein removing means, a drive shaft for driving said drum and also for moving said nozzle longitudinally back and forth across the drum and having intersecting right and left worm grooves therein having transfer grooves at the ends thereof, a sleeve mounted to slide along said shaft, a key accommodated in said sleeve for travelling alternately in said grooves to shift the sleeve longitudinally incident to the rotation of the shaft, means operatively associated with said key and shaft for lubricating said key and the grooves of the shaft, an outrigger bracket extending from said sleeve, and a track on the machine along which the free end of said bracket is adapted to travel with the sleeve to avoid rotation of the sleeve incident to the rotation of the shaft.

9. In a shrimp vein remover, a drum, a longitudinal series of lips projecting internally from the drum at an acute angle to a tangent to the drum, said lips being grouped in longitudinal series staggered transversely across the drum, the inner leading edges of the lips being rounded and smooth, means operatively associated with said drum and lips to direct a sheet of water through the drum and against the lips, a tank beneath and partially enveloping the drum to catch such water and maintain the same at a preselected level, means operatively associated with the drum for introducing peeled shrimp to one end of the drum, means operatively associated with the drum for withdrawing the treated shrimp from the other end of the drum, and means operatively associated with said drum and tank for rotating said drum.

10. For use in peeling shrimp having their back membrane broken exposing the vein of the shrimp, a shrimp vein remover comprising a support member, a lip extending from said support member and being positioned to engage the shrimp between its vein and meat and adapted to hook through the loop of the vein of said shrimp and wedge the vein between said lip and support member, and means operatively associated with said lip and support member for relatively moving the shrimp with respect to said support member to separate the vein from the shrimp meat.

11. In a shrimp vein remover, a drum, shrimp vein removing means in the drum, driving support means for the drum, and shrimp positioning and drum washing means operatively associated with the drum and with the shrimp veing removing means.

12. A shrimp vein remover comprising; hook-like vein engaging means, shrimp moving means operatively associated with said vein engaging means, and means associated with at least one of said above named means for effecting relative movement therebetween.

13. A shrimp vein remover as claimed in claim 12 further comprising means operatively associated with said hook-like means for clearing the accumulated veins from the hook-like means.

14. A shrimp vein remover comprising: hook-like shrimp vein engaging means, means operatively associated with said hook-like means for bringing the shrimp into potential position for engagement by the hook-like means, and means associated with said hook-like means for effecting relative movement between said hook-like means and the shrimp for initially effecting engagement of the vein and the hook-like means and finally breaking the attachment of the vein from the shrimp.

15. A shrimp vein remover comprising: a hook-like shrimp vein engaging means, means operatively associated with said hook-like means for bringing the shrimp into potential position for engagement by the hook-like means, and means operatively associated with said hook-like means for initially effecting engagement of the vein and the hook-like means and subsequently breaking the attachment of the vein from the shrimp.

16. For use in peeling shrimp having their back membrane broken exposing the vein of the shrimp, a shrimp vein remover comprising a support member, a vein engaging member extending from said support member and being positioned to engage the shrimp between its vein and meat and adapted to grasp the vein of said shrimp and wedge the vein between said vein engaging member and support member, and means operatively associated with said vein engaging member and support member for relatively moving the shrimp with respect to said support member to separate the vein from the shrimp meat.

17. A shrimp vein remover comprising a hook-like shrimp vein engaging means, means operatively associated with said hook-like means for bringing the shrimp into potential position for engagement by the hook-like means, and means associated with said hook-like means for effecting relative movement between said hook-like means and the shrimp and substantially transversely of the shrimp for initially effecting engagement of the vein and the hook-like means and finally breaking the attachment of the vein from the shrimp.

18. A shrimp vein remover comprising a stationary trough through which peeled shrimp are adapted to be moved, hook-like vein engaging means, shrimp moving means operatively associated with said vein engaging means, and means associated with at least one of said above named means for effecting relative movement therebetween.

19. A shrimp vein remover comprising a double walled trough having liquid chambers between the walls and through which peeled shrimp are adapted to be moved, the inner walls having perforations for permitting particles of the shrimp vein to pass therethrough, hook-like vein engaging means, shrimp moving means operatively associated with said vein engaging means and means associated with at least one of said above named means for effecting relative movement therebetween, said hook-like vein engaging means comprising the inner perforated walls and lips on the inner walls facing in the direction of the oncoming shrimp and propelling liquid.

20. A shrimp vein remover comprising a serpentine trough through which peeled shrimp are adapted to be moved having induction and discharge ends for the shrimp, hook-like vein engaging means, shrimp moving means operatively associated with said vein engaging means, and means associated with at least one of said above named means for effecting relative movement therebetween, said hook-like vein engaging means comprising lips in the trough faced toward the oncoming shrimp to engage and remove the veins therefrom.

21. A shrimp vein remover comprising a trough, hook-like vein engaging means, shrimp moving means operatively associated with said vein engaging means, and means associated with at least one of said above named means for effecting relative movement therebetween, said hook-like vein engaging means comprising curved and overlapping baffle plates in the trough having lips adapted to engage and remove the veins of the shrimp.

22. A shrimp vein remover comprising an imperforate trough having an induction end adapted to receive shrimp moved by a current of liquid through the trough, hook-like vein engaging means, shrimp moving means operatively associated with said vein engaging means, and means associated with at least one of said above named means for effecting relative movement therebetween, said hook-like vein engaging means comprising perforated convex and overlapping baffle plates extending down both sides of the trough and separated from one another to permit passage of the shrimp therebetween, said baffle plates having lips extending in the direction of the induction end of the trough for catching the loosened veins and pulling the same from the shrimp, the force of the liquid current being sufficient to break the detached veins into small particles and to wash them through the perforations in the baffle plates.

References Cited in the file of this patent

UNITED STATES PATENTS

| | | |
|---|---|---|
| 161,425 | McCabe | Mar. 30, 1875 |
| 1,715,991 | Chandler | June 4, 1929 |
| 2,331,855 | Vucassovich | Oct. 12, 1943 |
| 2,537,836 | Kite | Jan. 9, 1951 |
| 2,637,064 | Miller | May 5, 1953 |

FOREIGN PATENTS

| | | |
|---|---|---|
| 643,383 | France | May 15, 1928 |
| 475,307 | Germany | Apr. 22, 1929 |